(No Model.)

C. WARD.
WATER TUBE STEAM GENERATOR.

No. 297,649. Patented Apr. 29, 1884.

WITNESSES:

INVENTOR:
Charles Ward
BY
ATTORNEYS.

(No Model.) 2 Sheets—Sheet 2.

C. WARD.
WATER TUBE STEAM GENERATOR.

No. 297,649. Patented Apr. 29, 1884.

WITNESSES:

INVENTOR:
Charles Ward
BY
ATTORNEYS.

UNITED STATES PATENT OFFICE.

CHARLES WARD, OF CHARLESTON, WEST VIRGINIA.

WATER-TUBE STEAM-GENERATOR.

SPECIFICATION forming part of Letters Patent No. 297,649, dated April 29, 1884.

Application filed March 4, 1880. Renewed November 2, 1883. (No model.)

*To all whom it may concern:*

Be it known that I, CHARLES WARD, of Charleston, in the county of Kanawha and State of West Virginia, have invented a new and useful Improvement in Water-Tube Steam-Generators; and I do hereby declare that the following is a full, clear, and exact description of the same.

My present invention is an improvement upon that for which I have received Letters Patent of the United States No. 220,451. In such former invention, the steam-generating media are a series of semicircular tubes and vertical stand-pipes, the said tubes being placed at a slight inclination, to facilitate circulation of water and steam, and suitably coupled to the stand-pipes, so that all said parts form one connected system. This system surrounds a central vertical column or pillar of fire-brick, which occupies the center of the combustion-chamber and serves as a heat-radiating surface, and suitable pipes lead from the top and bottom of the system to a vessel termed a "separator," which is placed outside of but contiguous to the furnace-chamber. The water heated and exhausted in the said system of half-circle tubes and vertical stand-pipes enters the top of such vessel, where the steam and water are separated by gravity, the water passing again into the circulating system after being freed of a portion of its mud, scale, or other sediment. In the present invention, I place the separator inside the circulating system of pipes and inclose it with fire-brick, so that it not only subserves the purpose of a radiator, like the column or pillar in the former case, but heat and space and cost of construction are economized, and the conversion of water into steam is accelerated or facilitated. I also arrange the lower lateral arms or manifolds of the separator beneath the fire-grate, so that they afford substantial support for the stand-pipes or system of circulating-pipes, and are made easily accessible for the purposes of repair, &c., without disturbing other parts of the generator. There is likewise a change in the number of stand-pipes, besides such construction of the interior of the separator as will facilitate deposition of sediment. These and various other novel and valuable features of construction are hereinafter fully described.

Figure 1:
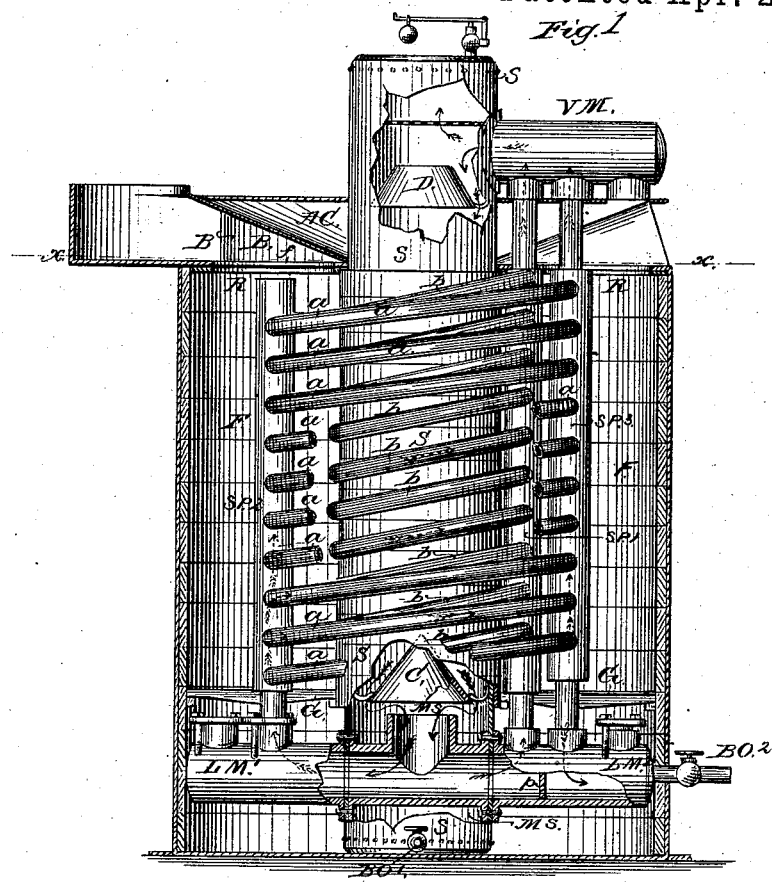
Figure 2:
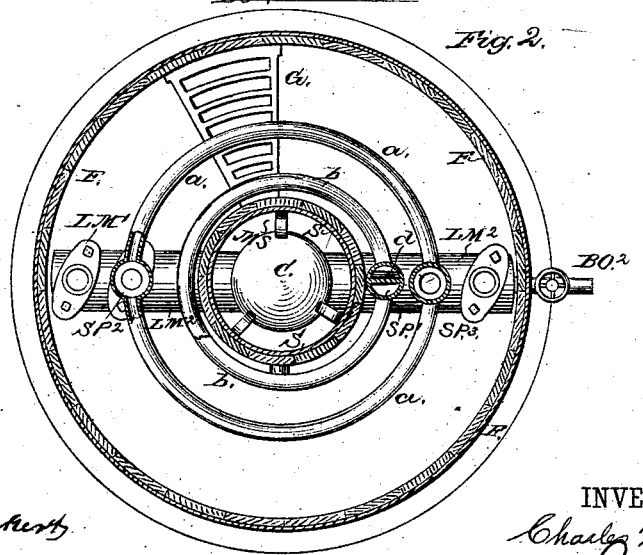
Figure 3:
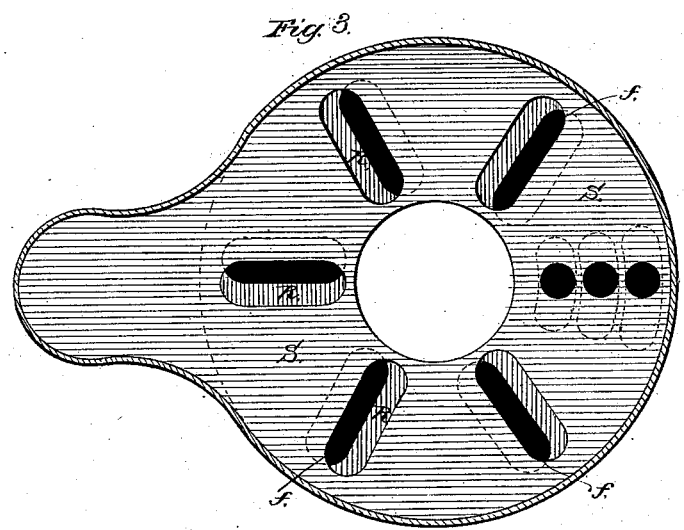
Figure 4:
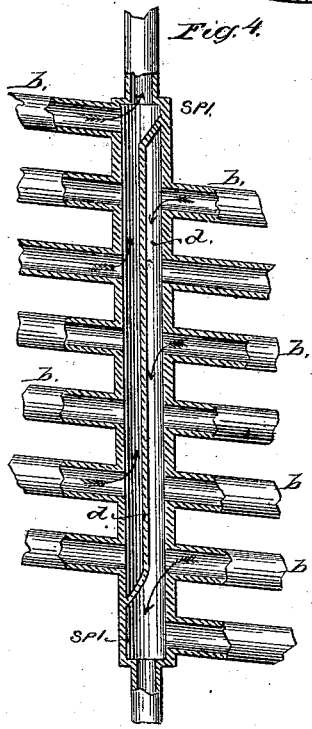

In the accompanying drawings, forming part of this specification, Figure 1 is mainly a vertical section of my improved generator. Fig. 2 is a horizontal central section of the same. Fig. 3 is a horizontal section on the line $x\, x$, Fig. 1. Fig. 4 is a detail section of one of the stand-pipes.

The vertical separator S occupies the center of the system of steam-generating tubes and pipes, and is concentric with the surrounding fire-brick-lined casing F of the combustion-chamber, above which it projects a short distance. There is but one upper lateral arm or manifold, V M, while there are two lower manifolds, L M' and L M$^2$. From the manifold L M' rises a vertical stand-pipe, S P$^2$, while the upper and lower manifolds, V M and L M$^2$, are connected by the stand-pipes S P' and S P$^2$. The upper manifold, V M, is located above the casing F, to allow it to be easily detached, so that any section or pile of rings or curved tubes may be removed at will for examination, repair, &c., by removing the cover. The lower manifolds, L M' and L M$^2$, are located below the grate G and rest on the floor of the ash-box, so as to support the whole system of steam-circulating pipes, besides making the stuffing-boxes readily accessible. This system consists of the aforesaid stand-pipes and the half-circle tubes $a$, which connect the stand-pipes S P$^2$ and S P$^3$, and of the circular tubes $b$, whose ends are joined to the inner stand-pipe, S P'. All these tubes $a\, b$ are inclined upward to their points of junction with stand-pipes S P' and S P$^2$, so that when the water therein expands by heat it will tend to move upward, and thus cause and maintain an active circulation, as indicated by single-headed arrows. The current of mingled water and steam enters upper manifold, V M, thence passes into the separator S, where the hollow frustum or conical deflector D diverts it against the sides of the separator, in order to further the conversion into steam and the separation of the water therefrom.

A short distance above the bottom of the separator, and directly over the common induction opening or mouth of the manifolds L M' and L M$^2$, is placed a hollow cone, C. The water circulates around and beneath said cone C, passing down and then up, as shown by arrows. The space below the cone constitutes a sediment or mud receptacle, M S, in which the mud settles and remains deposited, in consequence of the change in direction of the current at that point. From the lower part of the separator the current diverges laterally into the lower manifolds, L M' L M², but cannot enter the outer stand-pipe, S P³, owing to the partition p, which divides the manifold L M² transversely. The inner stand-pipe, S P', is divided vertically for nearly its whole length by a diaphragm, d, Fig. 4, so that the water is allowed to pass up and enter the tubes b on one side of the diaphragm, and escape therefrom on the other side, and thus pass up into manifold V M. The stand-pipe S P' is therefore in the nature of a twin pipe or the equivalent of two separate pipes. Thus one portion of pipe S P' is connected with the water-supply system from the lower manifold up, and the upper end of the other portion connects with the delivery system, so as to discharge the products of steam-generation into the upper manifold, and thence into the separator S.

A blow-off cock, B O', is affixed to the bottom of separator S, and another, B O², to the outer end of lower manifold, L M². To blow out the generator, the cock B O' is first opened, which will clear the mud, &c., from the separator and all connected parts, save the outer rings and stand-pipe, S P³. The cock B O² is thus opened and the blow-out completed. In this operation the partition p plays an important part. The double-headed arrows indicate the direction of the blow-out currents.

The top of the casing F is provided with an air-chamber, A C, which to a good degree prevents the radiation and waste of heat.

The bottom of the separator S is provided with openings f, and an adjustable draft-regulator, R, is arranged directly beneath it, as shown in Figs. 1 and 4. The regulator has corresponding openings, so that by adjusting it circularly the openings f in the smoke-box will be closed more or less, and the draft thereby regulated. The regulator R may have a radial handle projecting through the side of the casing F, for use in operating it.

It is obvious that the steam-generating system—to wit, separator, tubes, and stand-pipes—may be placed in other positions than the vertical one, although that is preferable for various reasons.

What I claim is—

1. The combination, with a series of semicircular or circular tubes and upper and lower manifolds, of a pipe having a lengthwise division-plate or diaphragm, as specified, whereby said pipe serves both for supply and discharge, as specified.

2. In combination with the cylindrical boiler or separator and manifold, a series of encircling-tubes which take their supply from above the mud-space through transverse supply-pipes, (from separator,) and deliver the water and steam into the cylindrical boiler by manifold, for the purpose of separating steam, water, and mud, substantially as described.

3. The combination, with the cylindrical boiler or separator having a mud-collector in its lower part, of vertical pipes c, a series of encircling-tubes which receive their supply at a point above the mud-collector or mud-space, and discharge into pipes that lead into the upper end of the separator, as specified.

4. The combination, with the vertical separator, of the deflector D, placed in its upper portion, and the series of tubes and stand-pipes connected with the separator at a point located above the deflector, as and for the purpose specified.

5. The combination, with the separator, of the annular mud-collector located in its lower portion, and the manifolds connected at a point below said collector, as specified.

6. The combination, with the annular mud-collector and the separator, of the cone which changes the course of the water and facilitates the deposition of mud, as specified.

7. The combination, with the separator and the system of tubes and stand-pipes, and the lower manifold having a partition, p, of the blow-off cocks attached, respectively, to the separator and manifold, as shown and described, to allow, first, blowing out the mud, and then the water, through all the circulating system.

CHARLES WARD.

Witnesses:
J. D. BAINES,
C. H. HATCHER.